(12) United States Patent
Bulin

(10) Patent No.: US 8,128,022 B2
(45) Date of Patent: Mar. 6, 2012

(54) DEVICE TO HANDLE AND LOCK A COVER OF AN AIRCRAFT NACELLE

(75) Inventor: Guillaume Bulin, Blagnac (FR)

(73) Assignee: Airbus Operations SAS, Toulouse (FR)

( * ) Notice: Subject to any disclaimer, the term of this patent is extended or adjusted under 35 U.S.C. 154(b) by 366 days.

(21) Appl. No.: 12/435,655

(22) Filed: May 5, 2009

(65) Prior Publication Data

US 2009/0272842 A1    Nov. 5, 2009

(30) Foreign Application Priority Data

May 5, 2008    (FR) ...................................... 08 02469

(51) Int. Cl.
*B64D 27/00*  (2006.01)
*B64D 27/16*  (2006.01)
*B64D 27/18*  (2006.01)
(52) U.S. Cl. ........................................ 244/54; 244/53 R
(58) Field of Classification Search .................. 244/54, 244/53 R, 129.4, 131, 110 B; 60/226.2, 798
See application file for complete search history.

(56) References Cited

U.S. PATENT DOCUMENTS

| | | | | |
|---|---|---|---|---|
| 5,035,379 A | * | 7/1991 | Hersen et al. ............. | 244/129.4 |
| 6,179,249 B1 | * | 1/2001 | Canadas ..................... | 244/53 R |
| 2010/0084507 A1 | * | 4/2010 | Vauchel et al. ............. | 244/1 N |

FOREIGN PATENT DOCUMENTS

| | | | |
|---|---|---|---|
| EP | 0 391 795 | | 10/1990 |
| FR | 2 757 823 | | 7/1998 |
| FR | 2 906 568 | | 4/2008 |
| GB | 128 421 | | 6/1919 |
| GB | 128421 | * | 6/1919 |
| WO | WO2008040877 | * | 4/2008 |

OTHER PUBLICATIONS

Written Opinion of the French Patent Office, dated May 5, 2008 and issued in corresponding French Patent Application No. FA707378.

* cited by examiner

*Primary Examiner* — Timothy D Collins
*Assistant Examiner* — Nicholas McFall
(74) *Attorney, Agent, or Firm* — Young & Thompson

(57) ABSTRACT

The object of the invention is an aircraft nacelle that comprises, on the inside, an inside pipe (56) that empties out toward the front at an air intake (58), and, on the outside, an aerodynamic wall that extends from the air intake (58) up to the rear end of the nacelle, and a hood (62) that comprises said air intake (58) as well as a cylindrical wall (64) that forms at least one portion of the aerodynamic surface of the outside of the nacelle, whereby said hood (62) can move translationally relative to a stationary part of the nacelle toward the front along slides (72), each slide (72) comprising a guide element (74) that is connected to the hood (or to the stationary part of the nacelle), whereby said guide element (74) can slide into a pipe (78) that is connected to the stationary part of the nacelle (or to a hood) and has a section that is above the section of the guide element (74) so as to allow the hood (62) to rotate in order to immobilize it in the closed position.

20 Claims, 6 Drawing Sheets

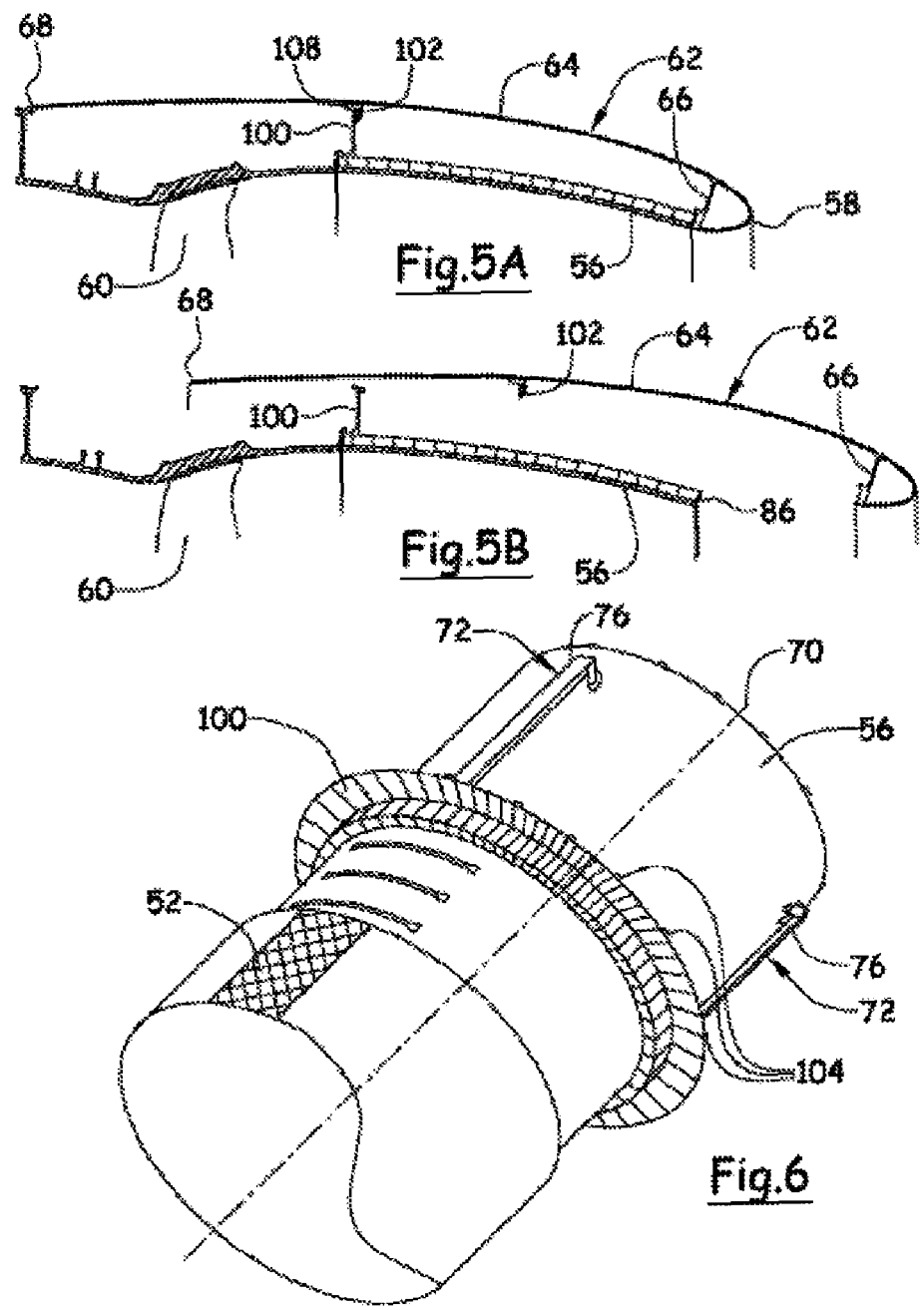

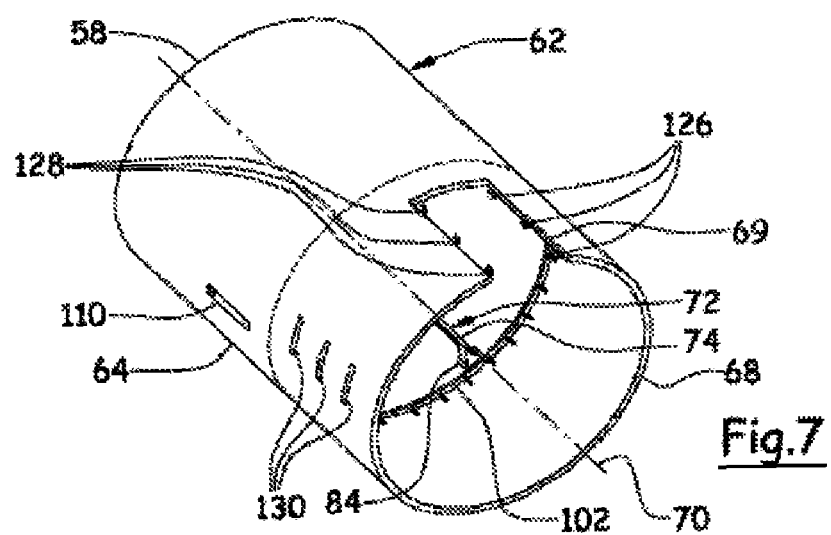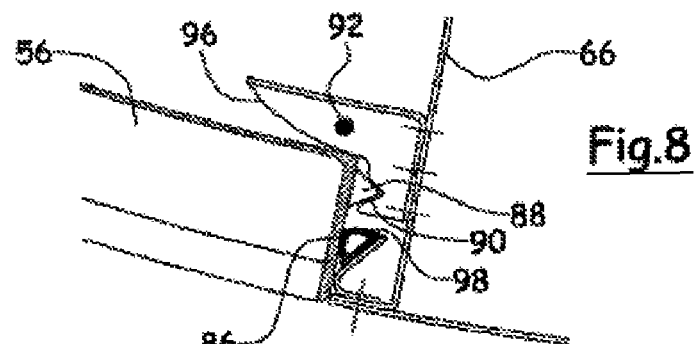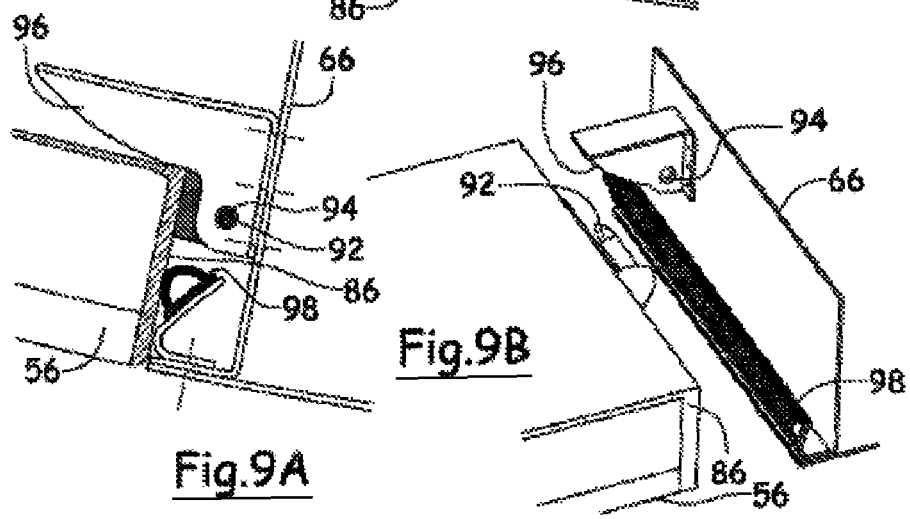

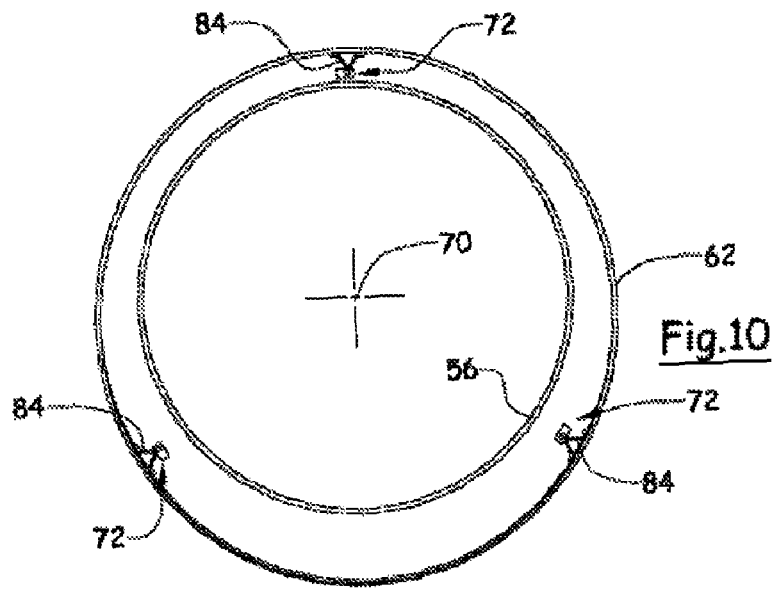
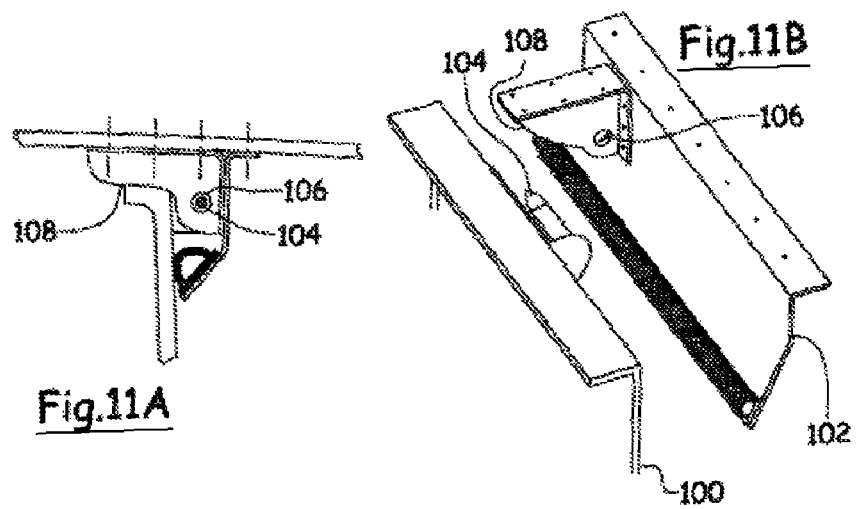

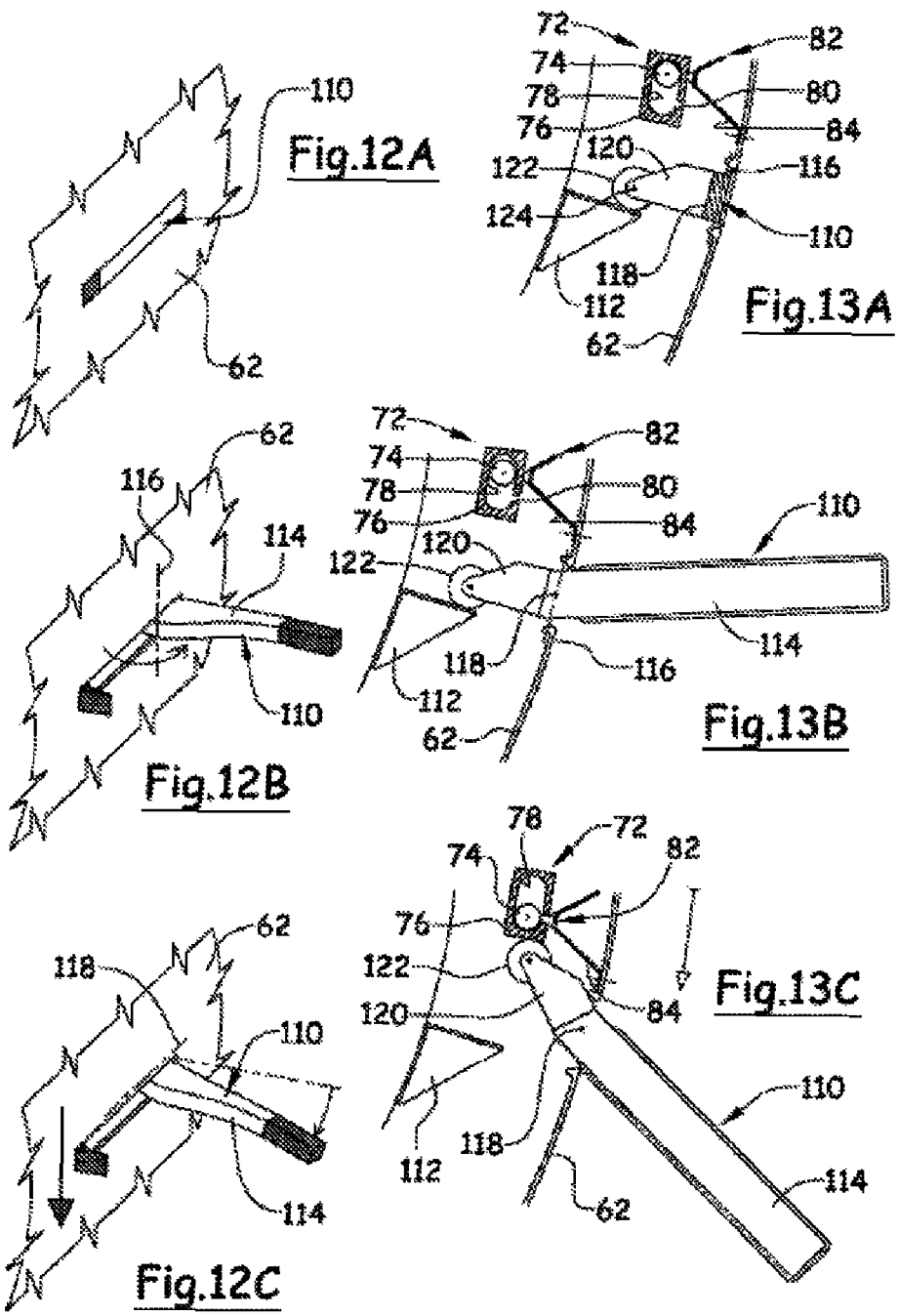

DEVICE TO HANDLE AND LOCK A COVER OF AN AIRCRAFT NACELLE

This invention relates to a device for maneuvering and locking a hood of an aircraft nacelle.

Aircraft engines are generally integrated inside a structure, called a nacelle below, and connected by connecting means to the aircraft, for example using a mast to the wing.

This nacelle has several functions, in particular those to regulate and control the movements of the air around and in the engine so as to optimize the aerodynamic flow, to protect the engine from outside elements, to minimize noise pollution, to ventilate internal zones, to participate in the dispersion of mechanical stresses of the engine, and optionally to support the thrust reverser systems.

Finally, the nacelle is to allow the daily upkeep and the maintenance of the engine and its components.

For this purpose, the nacelle comprises, at its outside surface, an opening that allows access to the inside of the nacelle and a moving part that can occupy at least two positions, a first so-called closed position in which said moving part is located in the extension of the outside surface of the nacelle so as to block said opening, and a second position in which it at least in part detaches the opening. Hereinafter, the moving part is called a hood.

Figure 1:
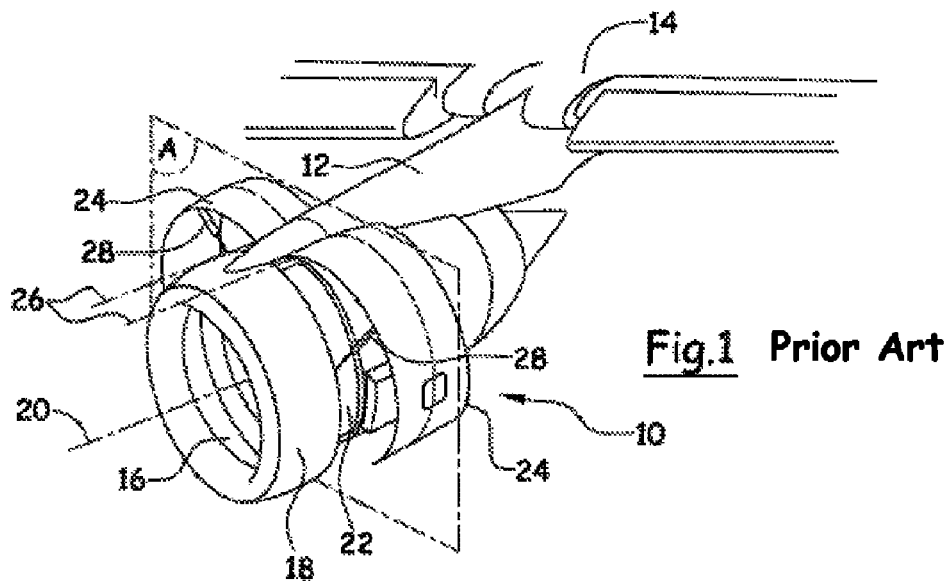

In FIG. 1, a nacelle that is connected by a mast 12 to a wing 14 is shown at 10, whereby said nacelle comprises an air intake 16 at the front and a lateral fuselage 18 with a longitudinal axis 20. The nacelle 10 comprises at least one opening 22, preferably two openings located on each side, on both sides of the mast 12, each able to be blocked respectively by a hood 24.

According to a first embodiment of the prior art, each hood 24 is hinged relative to the upper edge of the opening 22 and pivots around an axis 26 that is essentially parallel to the axis 20 of the nacelle, located close to the mast 12.

In addition, locking means are provided to keep the hoods 24 closed. In general, two stands 28 are provided to keep each hood in the open position. For small propulsion units, the hoods are raised by the operators. For some propulsion units, in particular large units, assistance in opening can be provided to raise the hood.

Even if this type of hood is relatively simple and allows easy access to the parts that are mounted in the low part of the engine, it is not entirely satisfactory for the following reasons:

The fact that the hood moves this way does not make it possible to detach the opening completely. To access certain parts of the engine, the operator has to slide between the hood and the engine. This position is relatively dangerous to the extent that the hood can suddenly close again, in the event of wind gusts, for example.

In addition, in the event of a handling error, the hood can open at the wrong time and be lost in flight, posing a hazard to the aircraft and creating a significant repair expense.

Finally, whereby the hood is relatively flexible, phenomena of scooping or stepping arise between the hood in the closed position and the downstream and upstream parts at the origin of parasitic drag, erosion and aesthetic stresses on the decoration of propulsion units.

Figure 2:
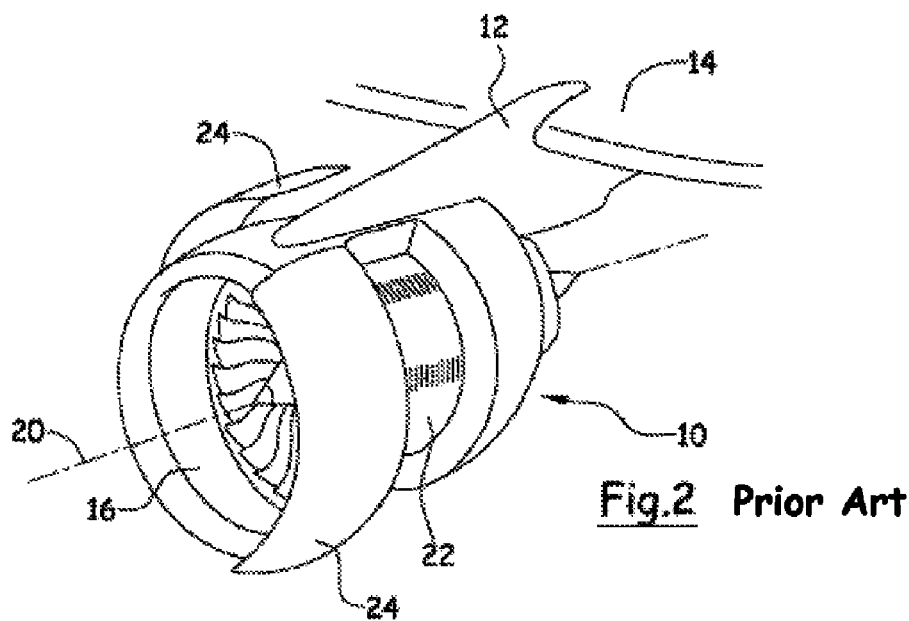

According to a second embodiment that is described in the documents FR-2,901,245 and US2007/0278345 and illustrated in FIG. 2, the hood 24 is connected using a hinge that makes it possible to completely detach the opening. This hinge comprises at least one arm that is connected by means of a first pivoting axis to the nacelle and by means of a second pivoting axis to the hood, whereby the two pivoting axes are essentially parallel.

Even if this approach makes it possible to improve accessibility, it does not prevent the loss in flight of the hood and requires a large number of holding and locking systems that contribute to increasing the on-board weight.

Figure 3:
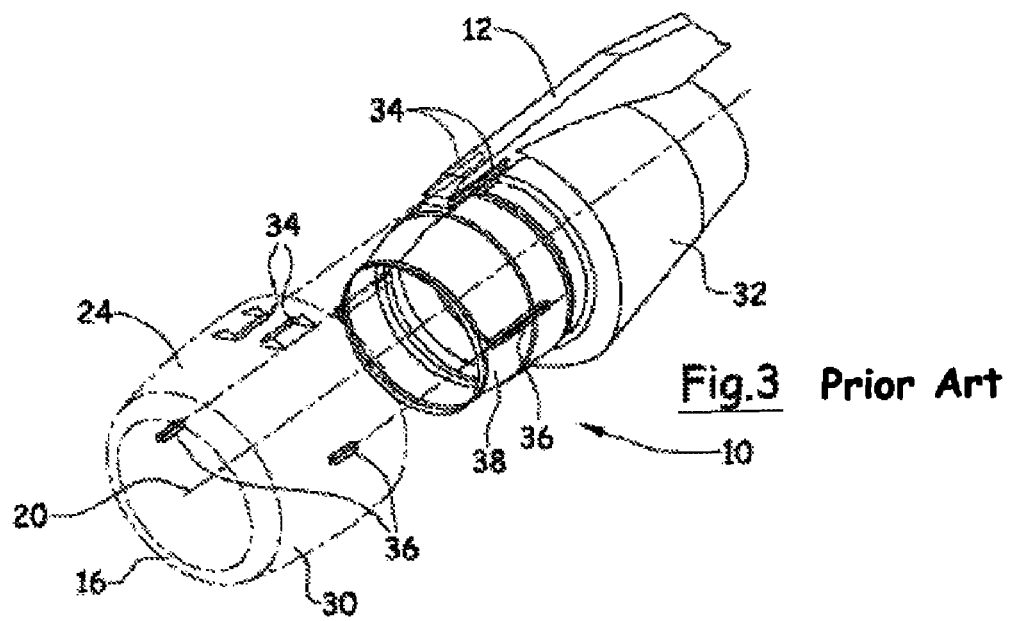

According to another embodiment that is illustrated in FIG. 3 and described in the document U.S. Pat. No. 5,609,313, the nacelle 10 comprises a moving part 30 that forms a hood that extends from the air intake 16 up to the thrust reverser system 32, which, in sliding toward the front in a translation that is parallel to the axis 20 of the nacelle, allows access to the engine. To ensure the maneuvering of the hood 30, first slides 34 are provided on both sides of the mast 12 and second slides 36 are arranged, in a horizontal median plane, on the outside of the wall that delimits the inside pipe 38 of the nacelle that is generally covered by a panel for the acoustic treatment. To ensure the centering of the air intake 16 with the inside pipe 38, centering pieces are distributed on the rear frame of the air intake working with openings that are made at the edge of the inside pipe 38.

A power plant can be provided to generate the translational movement of the hood 30. To keep the hood in the closed position, the nacelle comprises locking means in the form of several hooks that are integral with the stationary part and that are each able to work with a catch that is connected to the hood 30.

Contrary to the preceding embodiment, this approach limits the risks of opening at the wrong time or being lost in flight because the hood is naturally kept in the closed position using air flows even in the event that the locking systems break.

This approach is not satisfactory, however, because if it is desired to obtain a reliable locking system, it is then advisable to multiply the number of hooks, which leads to increasing the on-board weight and the number of bolts for the operator to maneuver during the opening. Likewise, it is necessary to maneuver all of the bolts to achieve an effective locking.

The document U.S. Pat. No. 6,340,135 describes a variant of the approach that is described above.

In this case, the moving part in addition comprises the inside pipe. To maneuver the hood, slides are provided on both sides of the mast. A power plant is provided to ensure this translation. To ensure the centering of the moving part, the inside pipe, at its edge, comprises a circumferential groove that projects along the longitudinal direction of the nacelle, able to work with a circumferential undercut that is provided at the stationary part.

To keep the hood in the closed position, the nacelle comprises locking means that comprise a circumferential undercut in which a rod with beads that are spaced and distributed over its circumference and that work with holding means that are spaced and distributed over the circumference of the rear part of the hood can slide. When the hood is unlocked, the holding means are offset angularly relative to the beads of the rod. To achieve locking, the rod slides into the circumferential undercut so that the beads work with the holding means.

Even if this approach makes it possible to detach the engine, it is not satisfactory because the guiding of the hood is inadequate and creates a significant cantilever in the open position. Furthermore, the locking system is not reliable because the operator can maneuver the rod even if the beads are not in the same plane as the holding means.

Also, the object of this invention is to remedy the drawbacks of the prior art by proposing a device for maneuvering and locking a hood of an aircraft nacelle that is easy to handle and reliable.

For this purpose, the invention has as its object an aircraft nacelle that comprises, on the inside, an inside pipe that empties out toward the front at an air intake, and, on the outside, an aerodynamic wall that extends from the air intake up to the rear end of the nacelle, and a hood that comprises said air intake as well as a cylindrical wall that forms at least one portion of the aerodynamic surface of the outside of the nacelle, whereby said hood can move translationally relative to a stationary part of the nacelle toward the front along slides, each slide comprising a guide element that is connected to the hood (or to the stationary part of the nacelle), whereby said guide element can slide into a pipe that is connected to the stationary part of the nacelle (or to the hood) and has a section that is above the section of the guide element so as to allow a rotation of the hood to immobilize it in the closed position.

Figure 4:
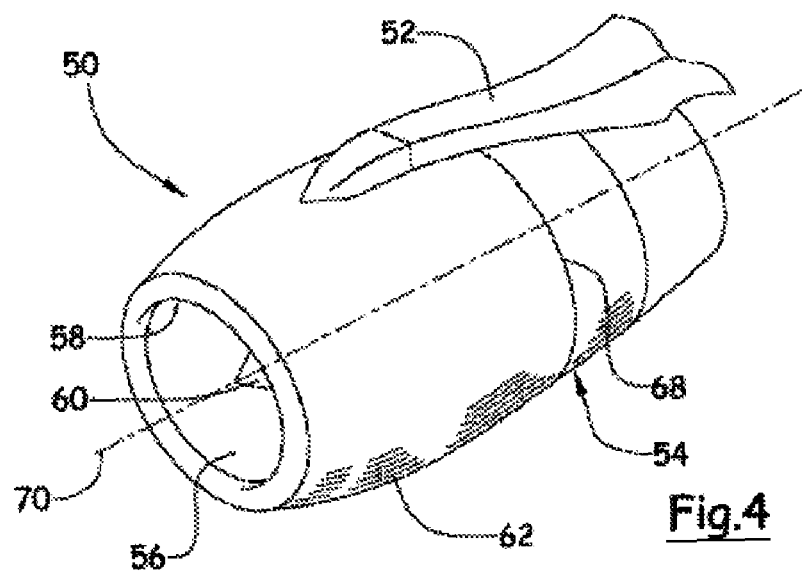

Other characteristics and advantages will emerge from the following description of the invention, a description that is provided only by way of example, opposite accompanying drawings in which:

FIG. 1 is a perspective view of a nacelle that illustrates the way a hood moves according to a first embodiment of the prior art, FIG. 2 is a perspective view of a nacelle that illustrates the way a hood moves according to a second embodiment of the prior art, FIG. 3 is a perspective view of a nacelle that illustrates the way a hood moves according to a third embodiment of the prior art, FIG. 4 is a perspective view of a propulsion unit, FIG. 5A is a section along a plane that contains the longitudinal axis of the nacelle that illustrates the hood and the inside pipe of the nacelle in the closed position, FIG. 5B is a section along a plane that contains the longitudinal axis of the nacelle that illustrates the hood and the inside pipe of the nacelle in the open position, FIG. 6 is a perspective view of the front of the nacelle without a hood, FIG. 7 is a perspective view of a hood according to the invention, FIG. 8 is a section that illustrates a variant of the means for hooking the hood from the front relative to the stationary part of the nacelle, FIG. 9A is a section that illustrates another variant of the means for hooking the front part of the hood relative to the stationary part of the nacelle in the closed position, FIG. 9B is a perspective view that illustrates the variant of the hooking means of FIG. 9A in the open position, FIG. 10 is a cross-section of a nacelle that illustrates the guide means of the hood according to the invention, FIG. 11A is a section that illustrates a variant of the means for hooking the rear part of the hood relative to the stationary part of the nacelle in the closed position, FIG. 11B is a perspective view that illustrates the hooking means of FIG. 11A in the open position, FIG. 12A is a view that illustrates a locking/unlocking handle in the retracted position, FIG. 12B is a view that illustrates a locking/unlocking handle in the deployed position before the rotation of the hood, FIG. 12C is a view that illustrates a locking/unlocking handle in deployed position after the rotation of the hood, FIG. 13A is a section that illustrates a locking/unlocking handle in the retracted position, FIG. 13B is a section that illustrates a locking/unlocking handle in deployed position before the rotation of the hood, and FIG. 13C is a section that illustrates a locking/unlocking handle in deployed position after rotation of the hood.

In FIGS. 4, 5A, 5B, 6, and 7, a propulsion unit that is connected to the remainder of the aircraft by a mast 52 that comprises a nacelle 54, inside of which a power plant is placed, is shown at 50. The invention is not limited to this type of installation of a propulsion unit, whereby the latter can be connected differently to the aircraft.

On the inside, the nacelle 54 comprises an inside pipe 56 that empties out toward the front at an air intake 58 and extends to the rear in a fan 60. On the outside, the nacelle 54 comprises an aerodynamic wall that extends from the air intake 58 up to the rear end of the nacelle.

This aerodynamic wall comprises at least one moving part that is called hood 62 below, so as to allow access inside the propulsion unit and more particularly to the power plant.

According to one embodiment, the hood 62 comprises the air intake 58 as well as a cylindrical wall 64 that forms at least one part of the aerodynamic surface of the outside of the nacelle. According to this embodiment, the aerodynamic surface of the hood 62 extends from a rear frame 66 of the air intake 58 up to a rear edge 68 that comprises a cutaway 69 that allows the passage of the mast 52, as illustrated in FIG. 7.

Even if the hood can be obtained by assembling various parts that are optionally made of various materials, all of the parts of the hood are kinematically linked.

The hood 62 can move in translation toward the front in a direction that is essentially parallel to the longitudinal axis 70 of the nacelle, between a so-called closed state in which the hood 62 covers the power plant, whereby the rear frame 66 of the air input is in contact with the inside pipe 56 and the rear edge 68 of the hood is in contact with the stationary part of the nacelle, as illustrated in FIG. 5A, and a so-called open state in which the hood 62 allows access to the power plant, whereby the rear frame 66 of the air intake is separated from the inside pipe 56 and the rear edge 68 of the hood is separated from the stationary part of the nacelle, as illustrated in FIG. 5B.

To ensure this translation, the nacelle comprises slides 72 between the hood 62 and the stationary part of the nacelle.

These slides 72 are provided at the inside pipe 56, in particular on the rear surface of the acoustic attenuation panel that delimits the inside pipe 56, as illustrated in FIG. 6.

According to one embodiment that is illustrated in FIG. 10, the guiding between the hood and the fixed part of the nacelle comprises three slides 72, arranged at 120°, whereby one of them is placed at the upper generator of the inside pipe 56.

The fact of providing guidance to the right of the inside pipe and not integrating said inside pipe in the hood makes it possible to reduce the cantilever when the hood is open.

As illustrated in FIGS. 6, 7, 10, and 13A to 13B, each slide 72 comprises a guide element 74, for example a cylindrical rectilinear bar that extends along the longitudinal direction 70, preferably connected to the inside surface of the hood 62.

According to the invention, the immobilization of the hood in the closed position is achieved following a rotation of the hood 62 around an axis that is parallel to the longitudinal axis 70. For this purpose, each slide 72 comprises a guide element 74 that is connected to the hood (or to the stationary part of the nacelle), and a sliding element 76 that is connected to the stationary part (or respectively to the hood) that comprises a pipe 78 whose section is above the section of the guide element 74 so as to allow a slight rotation of the hood 62.

When the hood 62 comprises a cutaway 69 for allowing the passage of the mast, this cutaway 69 has larger dimensions in the section of said mast that are suitable for allowing the hood to rotate. A skirt (not shown) that is integral with the mast can be provided to cover the play between the mast and the hood 62.

According to one embodiment that is illustrated in FIGS. 13A to 13C, a guide element 74 comes in the form of a rectilinear bar of cylindrical section, and the pipe 78 of a sliding element 76 has an oblong section, whereby the width of the oblong section is essentially equal to the play close to the diameter of the bar, and its length is suitable for the angular rotation of the hood 62.

According to one embodiment that is illustrated in FIG. 6, the sliding element 76 comes in the form of a rectilinear element with a rectangular section that is oriented along the longitudinal axis 70 and is connected to the stationary part of the nacelle using at least two crosspieces that are arranged at each of its ends.

To ensure the assembly of the hood on the stationary part, the sliding element 76 comprises a slot 80 that allows the passage of the connecting means 82 between the guide element 74 and its support, in this case the hood.

According to one embodiment, the connecting means 82 between a guide element 74 and the hood comprise at least two crosspieces 84 that are arranged close to each end of the guide element 74 in the shape of a V whose free ends are attached to the hood and the tip to the guide element 74, as illustrated in FIGS. 13A to 13C.

According to another characteristic of the invention, the nacelle comprises at least one keying pin that allows the hood to rotate when said hood is, along the longitudinal direction, in a position that corresponds to the closed state of the hood. This arrangement makes it possible to obtain a reliable closing mechanism to the extent that the rotation of the hood is possible only if the latter occupies a correct position in which a continuity of the aerodynamic surfaces of the hood and the stationary part of the nacelle is achieved.

According to a first variant, the arrangement of the various guide parts of the hood is such that the slot 80 does not allow the passage of the connecting means 82 when the hood is in the closed state, whereby said connecting means 82 are arranged to the right of the slot when the hood has pivoted to make possible the translation of said hood. According to one embodiment, the crosspieces 84 are separated by a distance that is greater than or equal to the length of the sliding element 76, and at least one end of said sliding element 76 rests against at least one of the crosspieces 84.

According to another characteristic of the invention that is illustrated in FIG. 10, the hood is slightly eccentric relative to the stationary part of the nacelle so that the center of gravity of the hood is arranged directly at the base and under the longitudinal axis 70 in the closed state. This arrangement makes it possible to achieve a stable position in the closed state so as to make the mechanism more reliable. In addition, it contributes to help lock the hood, whereby the latter has a tendency to pivot toward the closed state.

The nacelle also comprises front hooking means, illustrated in FIGS. 8, 9A and 9B, ensuring a structural continuity between the air intake and the inside pipe and a continuity of aerodynamic surfaces of the air intake and the inside pipe.

According to one embodiment that is illustrated in FIG. 8, the edge 86 of the inside pipe 56 comprises a shape 88 that projects along the longitudinal direction, for example a circumferential shape, able to work with a housing 90, for example a circumferential rib, of a suitable shape, provided at the rear frame 66 of the air intake.

According to another embodiment that is illustrated in FIGS. 9A and 9B, the edge 86 of the inside pipe 56 comprises, on the one hand, alignment pieces 92 that are arranged in a plane that is perpendicular to the longitudinal axis 70 in a tangential direction and distributed over the circumference of the stationary part, and, on the other hand, housings 94 that are integral with the rear frame 66 of the air intake, arranged in planes that contain the longitudinal axis, each able to work with an alignment piece 92.

The alignment pieces 92 and the housings 94 play the role of keying pin and also reinforce the reliability of the mechanism to the extent that the hood cannot rotate until the latter is in a correct position along the longitudinal direction corresponding to the closed state.

Advantageously, the front hooking means comprise at least one guide rail 96 to help position the parts of the hood relative to the parts of the stationary part that can work with them.

Preferably, the guide rails 96 are distributed over the circumference of the nacelle so as to obtain a continuity of the aerodynamic surfaces and to reduce the surface defects that may reduce the aerodynamic performance levels. According to one embodiment that is illustrated in FIGS. 9A and 9B, the guide rails 96 each come in the form of a plate with an edge of a shape that is suitable for guiding the inside pipe and a housing 94 that can accommodate an alignment piece 92.

The two hooking means, namely the alignment pieces 92 and the circumferential projecting shape 88, can be combined as illustrated in FIG. 8. Preferably, sealing means are placed between the edge 86 of the inside pipe 56 and the rear frame 66 of the air intake. According to one embodiment that is illustrated in FIG. 9B, the sealing means come in the form of a circumferential joint 98.

In the case of a defrosting system of the air intake by hot air, the circumferential sealing joint 98 is not flattened directly against the rear frame 66 but is offset. Thus, said joint is connected to an angle bar that makes it possible to provide an air knife between the rear frame and the joint so as not to burn the latter.

The nacelle also comprises rear hooking means, illustrated in FIGS. 5A, 5B, 6, 11A and 11B, ensuring a structural continuity between the hood and the stationary part, a firewall between the zone of the fan and the inside volume of the air intake, as well as a continuity of aerodynamic surfaces at the outside of the nacelle.

For this purpose, the stationary part comprises a rear frame 100 that is provided at the rear edge of the inside pipe 56, and the hood comprises, at its inside face, a collar 102 that can work with the rear frame 100.

According to one embodiment that is illustrated in FIGS. 11A and 11B, the rear frame 100 comprises alignment pieces 104 that are arranged in a plane that is perpendicular to the longitudinal axis 70 in a tangential direction and distributed over the circumference of the rear frame, and housings 106 that are integral with the collar 102 of the hood, provided in plates that are arranged in planes that contain the longitudinal axis 70, each able to work with an alignment piece 104.

The alignment pieces 104 and the housings 106 play the role of keying pin and also reinforce the reliability of the mechanism to the extent that the hood cannot rotate until the latter is in a correct position along the longitudinal direction that corresponds to the closed state.

Advantageously, the rear hooking means comprise at least one guide rail 108 to help position the parts of the hood relative to the parts of the stationary part that can work with them.

Preferably, the guide rails 108 are distributed over the circumference of the collar 102 so as to obtain a continuity of the aerodynamic surfaces and to reduce the surface defects that can reduce the aerodynamic performance levels. According to one embodiment that is illustrated in FIGS. 11A and 11B, the guide rails 108 each come in the form of a plate with an edge of a shape that is suitable for guiding the inside pipe and a housing 106 that can accommodate an alignment piece 104.

Advantageously, firewalls are provided between the rear frame 100 and the collar 102. According to one embodiment, the collar 102 comprises one end that is folded in the direction of the rear frame 100 that supports a circumferential fire seal.

As illustrated in FIGS. 12A to 12C and 13A to 13C, the hood also comprises locking/unlocking means that can occupy two states, a first locked state in which they immobilize the hood in the closed state after pivoting, and a second unlocked state in which they allow the hood to rotate.

According to one embodiment, the locking/unlocking means comprise a handle 110 that can pivot relative to the hood and a stop 112 that is integral with the stationary part of the nacelle.

Said handle 110 can occupy two states, a first locked state in which it cannot pivot and comes into contact with the stop 112 so as to immobilize the hood in rotation and a second unlocked state in which it can pivot and allows the hood to rotate.

The handle 110 comprises a moving part 114 around an axis of rotation 116 that is arranged in a transverse plane, whereby said moving part 114 is able to occupy two positions, a retracted position as illustrated in FIGS. 12A and 13A, in which the moving part 114 fits into a housing so that the surface of the handle is flush with the outside surface of the hood, and a deployed position, as illustrated in FIGS. 12B and 13B, in which after pivoting around the axis 116, the moving part 114 projects relative to the outside surface of the hood so as to be able to be gripped and maneuvered by an operator.

When the moving part 114 of the handle is in deployed position, said handle 110 can pivot around an axis of rotation 118 that is arranged in a longitudinal plane. When the moving part 114 is in the retracted position, said handle cannot pivot around the axis of rotation 118 and immobilizes the hood in rotation.

The stop 112 and the handle 110 are arranged so that in a first position that corresponds to the retracted position, the end 120 of the handle is in contact with the stop 112 and prevents the rotation of the hood, whereas after pivoting around the axis 118, the end 120 of the handle is separated from the stop 112 so as to allow the hood to rotate. The handle 110 is also used as a lever to make the hood pivot, as illustrated in FIGS. 12C and 13C.

Advantageously, the end 120 of the handle comprises a roller 122 that pivots around an axis of rotation 124 that is oriented along the longitudinal axis to facilitate the maneuvering of the handle and to limit friction between the handle and the support surfaces, in particular when the hood is closed.

The locking/unlocking means also comprise parts for locking the rear part of the hood, arranged after the rear frame 100, to the right of the mast 52.

According to one embodiment, the cutaway 69 is U-shaped and comprises at least one stationary hook 126 at one of the branches of the U and at least one hook 128 that is controlled by at least one handle 130 at the other branch of the U.

Thus, when the hood rotates toward the closed state, the hook(s) 126 and 128 are each hooked to a corresponding part of the mast 52.

During the movement in the opposite direction, the handle(s) 130 control(s) the hook(s) so as to unhook them. The stationary hook(s) unhook automatically using the rotational movement of the hood when the latter is opened.

The operating principle of the hood is now described with regard to various figures.

In the closed state, the handle 110 is in the retracted position, as illustrated in FIG. 12A, and the end 120 of the handle is in contact with the stop 112 and prevents the rotation of the hood, as illustrated in FIG. 13A.

To open the hood, the operator actuates the handle or handles 130 to unhook the hooks 128 that are fastened to the mast 52. Next, the handle 110 is deployed around the axis of rotation 116, as illustrated in FIG. 12B. It can then make the hood pivot by making use of the handle 110, as illustrated in FIGS. 12C and 13C. The pivoting of the hood makes it possible to automatically unhook the stationary hooks 126 that are connected to the mast and to detach the alignment pieces 92 and 104 from their respective housings 94 and 106. The hood can then be moved in translation toward the front in a direction that is essentially parallel to the longitudinal axis 70 along the slides 72.

To close the hood, the operator pushes the hood toward the rear in a direction that is essentially parallel to the longitudinal axis 70 along the slides 72. Using keying pins, the rotational operation of the hood can be carried out only when the hood is in position along the longitudinal axis 70 that corresponds to the closed state.

Next, the operator causes the hood to rotate optionally by making use of the handle 110. After pivoting, the hood is in the closed state. During this pivoting movement, the hooks 126 and 128 are automatically hooked so as to integrate the hood with the mast 52, and the alignment pieces 92 and 104 engage in their respective housings 94 and 106.

The hood can no longer move in translation toward the front.

The operator then pivots the handle 110 into the retracted position so that the latter can no longer pivot around the axis of rotation 118 and prevents the rotation of the hood by being in contact against the stop 112.

The invention claimed is:

1. An aircraft nacelle, comprising:
aerodynamic surface of an outside of the nacelle;
an air intake (58);
on an inside of the nacelle, an inside pipe (56) emptying out toward a front at the air intake (58);
on an outside of the nacelle, an aerodynamic wall extending from the air intake (58) up to a rear end of the nacelle; and
a hood (62) comprised of said air intake (58) and a cylindrical wall (64) that forms at least one portion of the aerodynamic surface of the outside of the nacelle;
a stationary part;
slides (72), each slide (72) comprising a guide element (74) connected by a connecting part (82) to the hood and a conduct (78) connected to the stationary part,
said guide element (74) having a rectilinear bar shape with a cylindrical section that can slide into the conduct (78) of the sliding element (76) that is connected to the stationary part;
wherein said hood (62) is movable translationally, relative to the stationary part, toward a front of the nacelle along the slides (72),
wherein the conduct (78) has an oblong section with a width essentially equal to a diameter of the bar and a length allowing a rotation of the hood (62) to immobilize the hood in the closed state,
wherein the sliding element (76) has a slot (80) extending parallel to the guide element (74), said slot (80) being positioned so as not to allow passage of the connecting part (82) and the translation of the hood (62) when the hood (62) is in the closed state,
wherein the connecting part (82) is arranged to the right of the slot when the hood has pivoted and allows the translational movement of said hood, said slot (80) having a width suited to the connecting part (82) so as not to allow the rotation of the hood (62) when the hood is not in the closed state.

2. The aircraft nacelle according to claim 1,
wherein the connecting part (82) comprises at least two crosspieces (84) arranged close to each end of the guide element (74),
wherein the crosspieces (84) are separated by a distance greater than or equal to the length of the sliding element (76), and at least one end of said sliding element (76) rests against at least one of the crosspieces (84) in the closed state.

3. The aircraft nacelle according to claim 1, wherein the front edge (86) of the inside pipe (56) comprises alignment pieces (92) arranged in a plane perpendicular to the longitudinal direction (70) of the nacelle in a tangential direction and distributed over the circumference of the front edge (86), each alignment piece (92) able to work with a housing (94) arranged in plane that contains the longitudinal axis, the housings being integral with a rear frame (66) of the hood (62) adjacent of the edge (86) of the inside pipe (56) in the closed state.

4. The aircraft nacelle according to claim 3, wherein the rear frame (66) of the hood (62) comprises guide rails (96) distributed over the circumference, each guide rail comprising a plate with an edge suitable for guiding the inside pipe (56) and a housing (94) that can accommodate an alignment piece (92).

5. The aircraft nacelle according to claim 1, wherein the front edge (86) of the inside pipe (56) comprises a circumferential shape (88) that projects along the longitudinal direction of the nacelle and arranged to work with a circumferential rib (90) provided at a rear frame (66) of the hood (62) adjacent of the edge (86) of the inside pipe (56) in the closed state.

6. The aircraft nacelle according to claim 1, wherein the hood (62) is eccentric relative to the stationary part so that the center of gravity of the hood is arranged at the base and under the longitudinal axis (70) in the closed state.

7. The aircraft nacelle according to claim 1, further comprising locking/unlocking means occupying two states defined by i) a first locked state in which the locking/unlocking means immobilize the hood in the closed state after pivoting, and ii) a second unlocked state in which the locking/unlocking means allow the hood to rotate.

8. The aircraft nacelle according to claim 6,
wherein the locking/unlocking means comprise a handle (110) that can pivot relative to the hood and a stop (112) integral with the stationary part, and
wherein said handle occupies i) a first locked state in which the handle cannot pivot and rests against said stop (112) and ii) a second unlocked state in which the handle can pivot and allows the hood (62) to rotate.

9. The aircraft nacelle according to claim 1, further comprising rear hooking means interposed between a rear frame (100) provided at the rear edge of the inside pipe (56) and a collar (102) that connected to the inside face of the hood (62).

10. The aircraft nacelle according to claim 1, wherein the hood comprises a cutaway (69) in a U shape allowing the passage of a mast (52), at least one stationary hook (126) at one of the branches of the U, and at least one hook (128) that is controlled by at least one handle (130) at another branch of the U.

11. An aircraft nacelle, comprising:
an air intake;
on an inside of the nacelle, an inside pipe (56) emptying out toward a front at the air intake (58),
on the outside of the nacelle, an aerodynamic wall that extends from the air intake (58) up to a rear end of the nacelle,
a hood (62) comprised of said air intake (58) and a cylindrical wall (64) forming at least one portion of an aerodynamic surface of the outside of the nacelle,
wherein said hood (62) is movable translationally relative to a stationary part of the nacelle toward the front along slides (72), each slide (72) comprising a guide element (74) connected by connecting means (82) to the stationary part of the nacelle,
wherein said guide element (74) has a rectilinear bar shape with a cylindrical section and is slideable into a conduct (78) of a sliding element (76) s connected to the hood,
wherein the conduct (78) has an oblong section with a width essentially equal to a diameter of the bar and a length allowing a rotation of the hood (62) to immobilize the hood in the closed state,
wherein the sliding element (78) has a slot (80) that extends parallel to the guide element (74), said slot (80) being positioned so as not to allow the passage of the connecting means (82) and the translation of the hood (62) when the hood (62) is in the closed state,
wherein the connecting means (82) is arranged to the right of the slot when the hood has pivoted to permit the translational movement of said hood, said slot (80) having a width relative the connecting means (82) so as not to allow the rotation of the hood (62) when the hood is not in the closed state.

12. The aircraft nacelle according to claim 11,
wherein the connecting means (82) comprise at least two crosspieces (84) arranged close to each end of the guide element (74),
wherein the crosspieces (84) are separated by a distance that is greater than or equal to the length of the sliding element (76), and
wherein at least one end of said sliding element (76) rests against at least one of the crosspieces (84) in the closed state.

13. The aircraft nacelle according to claim 11, wherein the front edge (86) of the inside pipe (56) comprises alignment pieces (92) arranged in a plane perpendicular to the longitudinal direction (70) of the nacelle in a tangential direction and distributed over the circumference of the front edge (86), each alignment piece (92) able to work with a housing (94) arranged in plane that contains the longitudinal axis, the housings being integral with a rear frame (66) of the hood (62) adjacent of the edge (86) of the inside pipe (56) in the closed state.

14. An aircraft nacelle according to claim 13, wherein the rear frame (66) of the hood (62) comprises guide rails (96) distributed over the circumference, each guide rail comprising a plate with an edge suitable for guiding the inside pipe (56) and a housing (94) that can accommodate an alignment piece (92).

15. An aircraft nacelle according to claim 11, wherein the front edge (86) of the inside pipe (56) comprises a circumferential shape (88) that projects along the longitudinal direction of the nacelle and arranged to work with a circumferential rib (90) provided at a rear frame (66) of the hood (62) adjacent of the edge (86) of the inside pipe (56) in the closed state.

16. An aircraft nacelle according to claim 11, wherein the hood (62) is eccentric relative to the stationary part of the nacelle so that the center of gravity of the hood is arranged at the base and under the longitudinal axis (70) in the closed state.

17. An aircraft nacelle according to claim 11, further comprising locking/unlocking means having two states defined by i) a first locked state in which the locking/unlocking means immobilize the hood in the closed state after pivoting, and ii) a second unlocked state in which the locking/unlocking means allow the hood to rotate.

18. An aircraft nacelle according to claim 17,
wherein the locking/unlocking means comprise a handle (110) that is pivotable relative to the hood and a stop (112) integral with the stationary part,
wherein said handle is able to occupy a first locked state in which the handle cannot pivot and rests against said stop (112) and a second unlocked state in which the handle can pivot and allows the hood (62) to rotate.

19. An aircraft nacelle according to claim 11, further comprising rear hooking means interposed between a rear frame (100) provided at the rear edge of the inside pipe (56) and a collar (102) connected to the inside face of the hood (62).

20. An aircraft nacelle according to claim 11,
wherein the hood comprises a cutaway (69) in a U shape for allowing the passage of a mast (52), and
further comprising at least one stationary hook (126) at one branch of the U, and at least one hook (128) controlled, by at least one handle (130), at another branch of the U.

* * * * *